(12) United States Patent
Arnott et al.

(10) Patent No.: US 9,714,066 B1
(45) Date of Patent: Jul. 25, 2017

(54) DECOUPLED DAMPER AND AIRSPRING SUSPENSION SYSTEM, DEVICE, APPARATUS AND METHOD FOR MOTORCYCLES

(71) Applicant: Arnott T&P Holding, LLC, Merritt Island, FL (US)

(72) Inventors: Adam M. Arnott, Windermere, FL (US); Matt Edward Kirar, Merritt Island, FL (US)

(73) Assignee: Arnott T&P Holding, LLC, Merritt Island, FL (US)

( * ) Notice: Subject to any disclaimer, the term of this patent is extended or adjusted under 35 U.S.C. 154(b) by 0 days.

(21) Appl. No.: 14/966,678

(22) Filed: Dec. 11, 2015

(51) Int. Cl.
*B62K 25/04* (2006.01)
*B62K 11/04* (2006.01)
*F16F 9/44* (2006.01)

(52) U.S. Cl.
CPC ............. *B62K 25/04* (2013.01); *B62K 11/04* (2013.01); *F16F 9/44* (2013.01); *B62K 2025/045* (2013.01); *B62K 2025/048* (2013.01)

(58) Field of Classification Search
CPC .. B62K 25/04; B62K 11/04; B62K 2025/045; B62K 2025/048; F16F 9/44
See application file for complete search history.

(56) References Cited

U.S. PATENT DOCUMENTS

| 2,324,058 | A | 7/1943 | Boor |
| 2,571,279 | A | 10/1951 | Myklestad |
| 2,856,035 | A | 10/1958 | Rohacs |
| 3,024,875 | A | 3/1962 | Stultz |
| 4,560,042 | A | 12/1985 | Sell |
| 4,566,565 | A | 1/1986 | Wicke |
| 4,664,234 | A | 5/1987 | Wight |
| 5,172,794 | A | 12/1992 | Ward |
| 5,458,219 | A | 10/1995 | Anderson |
| 5,833,036 | A | 11/1998 | Gillespie |
| 6,193,005 | B1 * | 2/2001 | Jurrens ................. B62K 25/04 180/227 |
| 6,244,398 | B1 | 6/2001 | Girvin |
| 6,357,546 | B1 | 3/2002 | Crosby |
| 6,374,966 | B1 | 4/2002 | Lillbacka |
| 6,648,309 | B2 | 11/2003 | Beck |

(Continued)

*Primary Examiner* — Kevin Hurley
*Assistant Examiner* — Marlon A Arce
(74) *Attorney, Agent, or Firm* — Brian S. Steinberger; Law Offices of Brian S. Steinberger (57) ABSTRACT

Combination adjustable air suspension shocks with separate dampers, systems, devices, apparatus, and methods, for motorcycles. Air suspension systems, devices, apparatus, and methods for allowing motorcycle drivers to increase and decrease compressed air supplies in air suspension devices. Deflating interior air springs/airbags (bladders) inside the devices allows for springs and pistons on shock absorbers in the devices to expand outward separating lower front and rear frame portions which effectively lowers the motorcycle to the ground surface and for the driver to have a firmer ride. Inflating the air springs/airbags (bladders) allows for the springs and the pistons on the shock absorbers in the devices to retract into the devices so that the devices have a more shock absorbing effect giving the rider a smoother ride, which also raises the motorcycles above the ground surface.

15 Claims, 10 Drawing Sheets

(56) References Cited

U.S. PATENT DOCUMENTS

| | | | |
|---|---|---|---|
| 7,011,174 B1* | 3/2006 | James | B62K 25/283 |
| | | | 180/227 |
| 7,546,894 B1 | 6/2009 | Glenn | |
| 7,559,396 B2* | 7/2009 | Schwindt | B62K 25/283 |
| | | | 180/227 |
| 7,798,295 B2 | 9/2010 | Jurrens | |
| 7,954,792 B2 | 6/2011 | Adonakis | |
| 8,113,322 B2* | 2/2012 | Arnott | F16F 9/43 |
| | | | 180/227 |
| 8,256,749 B2 | 9/2012 | Adonakis | |
| 8,292,306 B1 | 10/2012 | Arnott | |
| 2004/0245746 A1 | 12/2004 | Chamberlain | |
| 2009/0206530 A1* | 8/2009 | Arnott | F16F 9/43 |
| | | | 267/64.24 |
| 2010/0117320 A1 | 5/2010 | Grozev et al. | |
| 2010/0200343 A1 | 8/2010 | Kondo et al. | |
| 2014/0077466 A1* | 3/2014 | Murakami | B62K 25/04 |
| | | | 280/6.157 |
| 2014/0239602 A1 | 8/2014 | Blankenship et al. | |
| 2016/0075204 A1 | 3/2016 | Marking et al. | |

\* cited by examiner

DECOUPLED DAMPER AND AIRSPRING SUSPENSION SYSTEM, DEVICE, APPARATUS AND METHOD FOR MOTORCYCLES

This invention relates to air suspension and dampers, in particular to a combination adjustable air suspension shocks with separate dampers, systems, devices, apparatus, and methods, for motorcycles.

BACKGROUND AND PRIOR ART

Conventional, stock, and after-market suspension products such as air shocks and air springs are generally preset to a specific maximum weight accommodation level. This preset suspension does not always provide the best ride or handling for the riders. Additionally, motorcycles are known to have harsh rides that are not comfortable for many riders such as the elderly, overweight individuals, and women.

Current springs used in motorcycles can be progressive in that their lifespan and use deteriorate over time. For example, as the spring compresses, the spring weakens over time, making the ride less desirable for the riders.

Conventional air suspension systems often result in non-smooth and uncomfortable rides, coupled with undesirable vehicle ride performance.

Various types of air suspension systems have been proposed over the years. U.S. Pat. No. 6,648,309 to Beck describes a piston rod with low/high pressure chambers. U.S. Pat. No. 6,374,966 to Lillbacka describes a piston rod that moves within the chamber and is surrounded by an outer chamber with sealing gaskets. An o-ring seals isolate compartment from environment outside of shock absorber; compressible fluid in inner chamber; coil spring provided about piston rod; air inlet, a fluid, i.e. air, pumped into elastomeric tube so that the inflated elastomeric tube acts as air spring to enhance shock absorbing ability of shock absorber.

U.S. Pat. No. 6,244,398 to Girvin describes a shock absorber with a shaft that extends into a reservoir housing which includes a hydraulic reservoir and gas chamber. The chamber seal includes an o-ring to separate the gas chamber from the hydraulic reservoir. There are springs on the shaft, a piston, and shim washers at the end of the piston, a reservoir cap, reservoir seal, and a bumper.

U.S. Pat. No. 5,833,036 to Gillespie describes an airbag in a reservoir of a cylinder, a piston assembly disposed within an inner cylinder and mounted to a piston rod. The piston rod comprising of piston assembly piston, check valve, a seal ring, seal ring carrier, bypass spring, spring abutment plate, and an end outer cylinder sealed plate with threaded mounting member.

U.S. Pat. No. 5,458,219 to Anderson describes a piston; reservoir containing gas cells. U.S. Pat. No. 5,172,794 to Ward describes a gas bag; piston assembly disposed within inner cylinder; piston rod that moves within piston assembly and extends into rebound chamber; outer cylinder with end cap; seal ring; ring; spring; and an end cap.

U.S. Pat. No. 4,664,234 to Wight; U.S. Pat. No. 4,566,565 to Wicke et al.; and U.S. Pat. No. 4,560,042 to Sell et al.; each describe self pressurized dampers. U.S. Pat. No. 3,024,875 to Stultz describes a shock absorber. U.S. Pat. No. 2,571,279 to Nils O. Mykestad describes a cylinder that defines a fluid reservoir containing a sack where air is introduced to a piston rod with sealing means and springs bear against it. And U.S. Pat. No. 2,324,058 to A. Boor et al. describes a hydraulic shock absorber structure.

U.S. Pat. No. 8,113,322 to Arnott, which has the same assignee as the subject invention, which is incorporated by reference in its' entirety, describes a motorcycle air suspension system and method that requires the use of two identical air suspension devices 1, FIG. 14 mounted side by side to provide adjustable air suspension for the rider.

Figure 13:
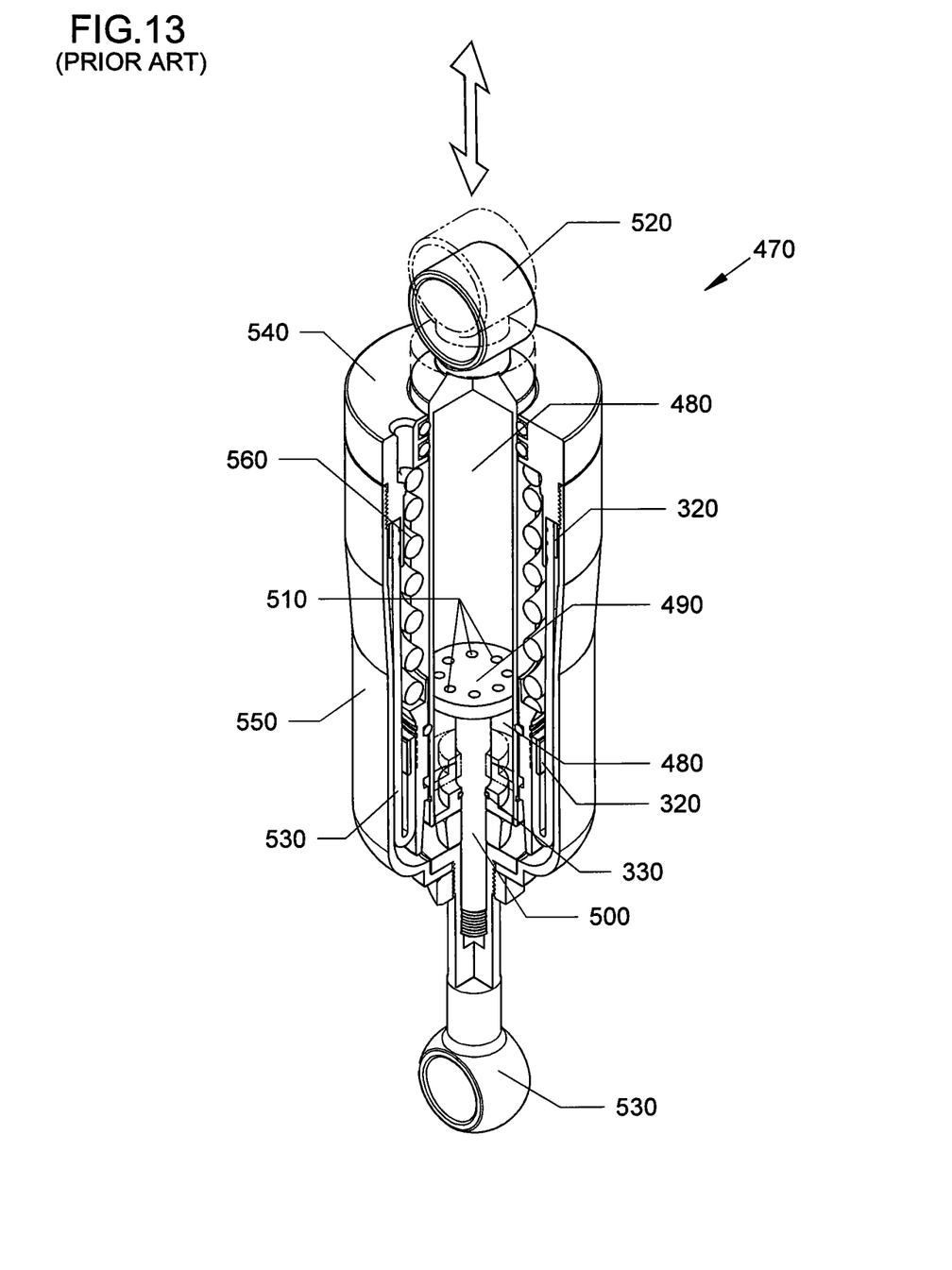
FIG. 13 is a cross-sectional view of a prior art shock assembly with oil filled damping piston.

FIG. 13 shows another prior art side cross-sectional view of a current shock that combines both air suspension through a spring and oil damping in one housing. Similar to Arnott '322, this combined air shock with damping would also be used in a pair arrangement as shown by FIG. 14 of the Arnott '322 patent.

FIG. 13 is a cross-sectional view of a prior art air suspension device with an internal damper 470. In the prior art assembly 470, includes an oil filled chamber 80 with an internal fixed damping piston 490 having a fixed damping piston shaft 500. Oil metering pass-through holes 510 are through the head of the piston 490. A ring attachment 520 secures the oil filled assembly to a bike frame or suspension member. Inside the air suspension device with internal damper 470 can be an airbag 530, top end 540, housing 550 and spring 560.

Combining both liquid damping with the air shock requires extra seals to keep fluid from leaking out of the housing and also contaminating the air suspension components in the same housing. As such, there can be reliability issues by combining both air suspension and the liquid damping effects in the same housing.

Additionally, the cost of using a pair of identical air suspension shocks with built in oil dampening adds extra expenses, where one or more of the combined units must be serviced and/or replaced.

The prior art discloses various types of air suspension systems and their respective components. However, none of the cited references overcomes the problems with the prior art described above. More particularly none of the prior art describes an easily adjustable system for use with motorcycles that allows the rider to have an adjustable ride based on the air suspension cylinders on those motorcycles.

Thus, the need exists for solutions to the above problems with the prior art.

SUMMARY OF THE INVENTION

A primary objective of the present invention is to provide combinations of adjustable air suspension shocks with separate dampers, systems, devices, apparatus, and methods, for motorcycles which is less expensive (lower cost) than a pair of adjustable air shocks with fluid damping in the same housings.

A secondary objective of the present invention is to provide combinations of adjustable air suspension shocks with separate dampers, systems, devices, apparatus, and methods, for motorcycles which provides larger air area (with lower air pressure) than a pair of adjustable air shocks with fluid damping in the same housings.

A third objective of the present invention is to provide combinations of adjustable air suspension shocks with separate dampers, systems, devices, apparatus, and methods, for motorcycles which uses less parts than a pair of adjustable air shocks with fluid damping in the same housings.

A fourth objective of the present invention is to provide combinations of adjustable air suspension shocks with separate dampers, systems, devices, apparatus, and methods, for motorcycles which uses uses less seals with more controlled sealing surfaces than a pair of adjustable air shocks with fluid damping in the same housings.

A fifth objective of the present invention is to provide combinations of adjustable air suspension shocks with separate dampers, systems, devices, apparatus, and methods, for motorcycles which is more reliable than using a pair of adjustable air shocks with fluid damping in the same housings.

A sixth objective of the present invention is to provide combinations of adjustable air suspension shocks with separate dampers, systems, devices, apparatus, and methods, for motorcycles to allow the rider to adjust the suspension to accommodate their personal weight as well as any cargo weight with a smoother ride base on a smoother and comfortable ride with suspension, adjustable suspension height, and adjustable suspension stiffness.

A seventh objective of the present invention is to provide combinations of adjustable air suspension shocks with separate dampers, systems, devices, apparatus, and methods, for motorcycles so that an increase of air will stiffen the ride and raise the suspension, while a release of air will soften the ride and lower the suspension.

An eighth objective of the present invention is to provide combinations of adjustable air suspension shocks with separate dampers, systems, devices, apparatus, and methods, for motorcycles to allow the shock absorber(s) to act as an extendable and retractable rod to lower or raise the vehicle.

A ninth objective of the present invention is to provide combinations of adjustable air suspension shocks with separate dampers, systems, devices, apparatus, and methods, for motorcycles where tuning air suspension is done to individual tastes and usually reduced to a few minutes via onboard adjustability.

A tenth objective of the present invention is to provide combinations of adjustable air suspension shocks with separate dampers, systems, devices, apparatus, and methods, for motorcycles where air suspension can be instantly set to specific driving conditions, resulting in improved drive handling.

An eleventh objective of the present invention is to provide combinations of adjustable air suspension shocks with separate dampers, systems, devices, apparatus, and methods, for motorcycles where adjustability can be customized between various settings that are smooth and comfortable, firm and rigid, or somewhere in the middle. Vehicle rider's performance can be based on the rider's desired settings, with existing components on the motorcycle.

A twelfth objective of the present invention is to provide combinations of adjustable air suspension shocks with separate dampers, systems, devices, apparatus, and methods, for motorcycles where adjustability can be based on the riders height, weight, desired ride comfort levels, and other customizations.

Unlike factory installed air suspension shocks, the invention allows the user to raise or lower the rear shocks through the full range of the suspension travel. This gives the rider the flexibility of setting the height of the rear suspension based on the rider's weight, height, and preference, helping ensure both safety and comfort through enhanced control and stability.

The invention can be manufactured to be used in motorized or non-motorized vehicles. This invention uses an inflatable air spring or rubber/elastomeric airbag/bladder, a shock absorber, a coil spring.

The invention allows for using an adjustable fluid shock, such as an air shock which can have fluid flow to increase and decreases air inside of the air shock. An hydraulic damper which is separate and decoupled from the adjustable fluid shock, is preferably attached side by side the adjustable fluid shock. The fluid can be air, liquid, or gas inside of the adjustable shock.

The benefits of this invention are a smoother suspension, adjustable suspension height, and adjustable suspension stiffness. A practical application of this invention would be on any softail motorcycle configuration as well as on other vehicles. The end user of the product can adjust the suspension to accommodate their personal weight as well as any cargo weight. This adjustability of the suspension is what improves the ride characteristics of the motorcycle for each individual user.

Conventional, stock, and after-market suspension are preset to a specific maximum weight accommodation level. This preset suspension does not always provide the best ride or handling. The invention allows the user to adjust the suspension levels of the vehicle according to their preference. By allowing the user to adjust the suspension level, the adjustable invention provides a comfortable ride, which in turn provides a more enjoyable ride experience. The suspension will absorb the right amount of shock or energy to prevent jerky handling, and adjusting the invention to the appropriate setting will allow the vehicle to handle safer than with a conventional or stock suspension. Air is pumped into and fills the air spring/airbag/bladder, which enables this adjustability; an increase of air will stiffen the ride and raise the suspension, while a release of air will soften the ride and lower the suspension.

Another difference between this invention and others is the use of o-rings to seal the shaft of the air spring. A unique aspect of the invention is that the shaft of the air spring slides between the o-rings. This allows the air spring to act as a rod to lower or raise the vehicle. The invention is divided into three separate assemblies: the spring, the shock absorber, and the casing. The air spring is assembled by using a sleeve, two static o-rings, coil spring, o-ring custom top, and crimp rings. Assembly of these parts forms the spring. The crimp rings are circularly compressed to the top and the sleeve to seal the air spring. The coil spring may or may not be used in some assemblies. Acting as a lift helper, the coil spring is used to decrease the amount of air pressure that would be needed to lift a load. It keeps the vehicle at a somewhat standard level, so that adjusting the lift level is not entirely dependent upon air pressure. In fact, with this invention, a minimal amount of air pressure is needed.

The invention combines a shock absorber with inflatable air spring/airbag/bladder and spring along with O-rings and other components. By placing two o-rings in the custom top, sliding the shaft through the spring, and securing the new assembly with the retaining ring, the assembly now has a completed spring and shock absorber that work together. The final assembly of the invention is the mounting and casing of the invention. The bump stop is placed over the extension rod, followed by the extension. The airbag can be placed over the existing assembly, and then secured by the hex nut. After tightening the hex nut, the assembly is ready for vehicle installation.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of the components will now be described.

10 air shock assembly without damper (air spring air suspension assembly
20 Damper assembly.
30 Optional ring attachment rod end.
40 Damper post.
50 Compressed air inlet.
60 Reciprocating rod (shaft) end on shock assembly.
70 Reciprocating rod (shaft) end on damper assembly.
80 Shock/damper attachment shaft is part of the rear suspension assembly and reciprocates toward the front and the back of the bike when the rear wheel encounters bumps in the road.
90 Rear wheel reciprocates up and down when it encounters bumps in the road. The rear suspension translates this motion into the forward and reward reciprocation of the shock/damper attachment shaft.
100 Motorcycle.
110 Air suspension control panel mounted on handlebar.
120 Air compressor.
130 Battery.
140 Motorcycle frame.
145 Frame attachment
150 Mono-tube damper assembly.
160 Rear wheel mount frame.
170 Fixed rod nut.
180 Fixed rod on shock assembly.
182 Stopper end
190 Fixed ring attachment on shock assembly.
200 Hard mounting point on motorcycle frame for securing the shock and damper assemblies.
210 Ring attachment secured to reciprocating rod on shock assembly.
220 Control button adds compressed air to the shock assembly and lifts the back of the bike.
230 Set button can lock the compressed air value after the desired pressure is attained.
240 Air gauge shows air pressure in shock assembly.
250 Control button bleeds compressed air from the shock assembly and drops the back of the bike.
260 Rubber shock absorbing ring on reciprocating rod of shock assembly.
270 Air bag can.
272 air space bottom of can
280 Top of shock assembly.
282 Inner chamber
285 conical opening
290 Bottom of shock assembly.
300 Coil spring.
310 Air bag.
320 Crimp ring.
330 Shaft seal.
335 Wiper seal.
340 Shaft bushing.
350 Interior wall threads for top.
360 Exterior top threads.
370 Interior wall threads for bottom.
380 Exterior bottom threads.
390 Piston.
400 Fixed rod external thread.
410 Bottom internal thread.
420 Piston internal thread.
430 Reciprocating rod external thread.
440 Air bag air chamber.

450 Groove pattern on piston skirt for air bag crimp ring grip.
460 Groove pattern on top for air bag crimp ring grip.
470 Prior art shock assembly with internal damper.
480 Oil filled, reciprocating piston with an internal fixed damping piston. The damping piston is perforated to pass oil at a metered rate and thereby "damp" the action of the shock assembly.
490 Fixed internal damping piston.
500 Fixed damping piston shaft.
510 Oil metering pass-through holes in damping piston.
520 Ring attachment on reciprocating piston secures to bike frame or suspension member.
530 Prior art airbag.
540 Prior art top.
550 Prior art air bag can.
560 Prior art coil spring.

Figures 1, 1A, 1B:
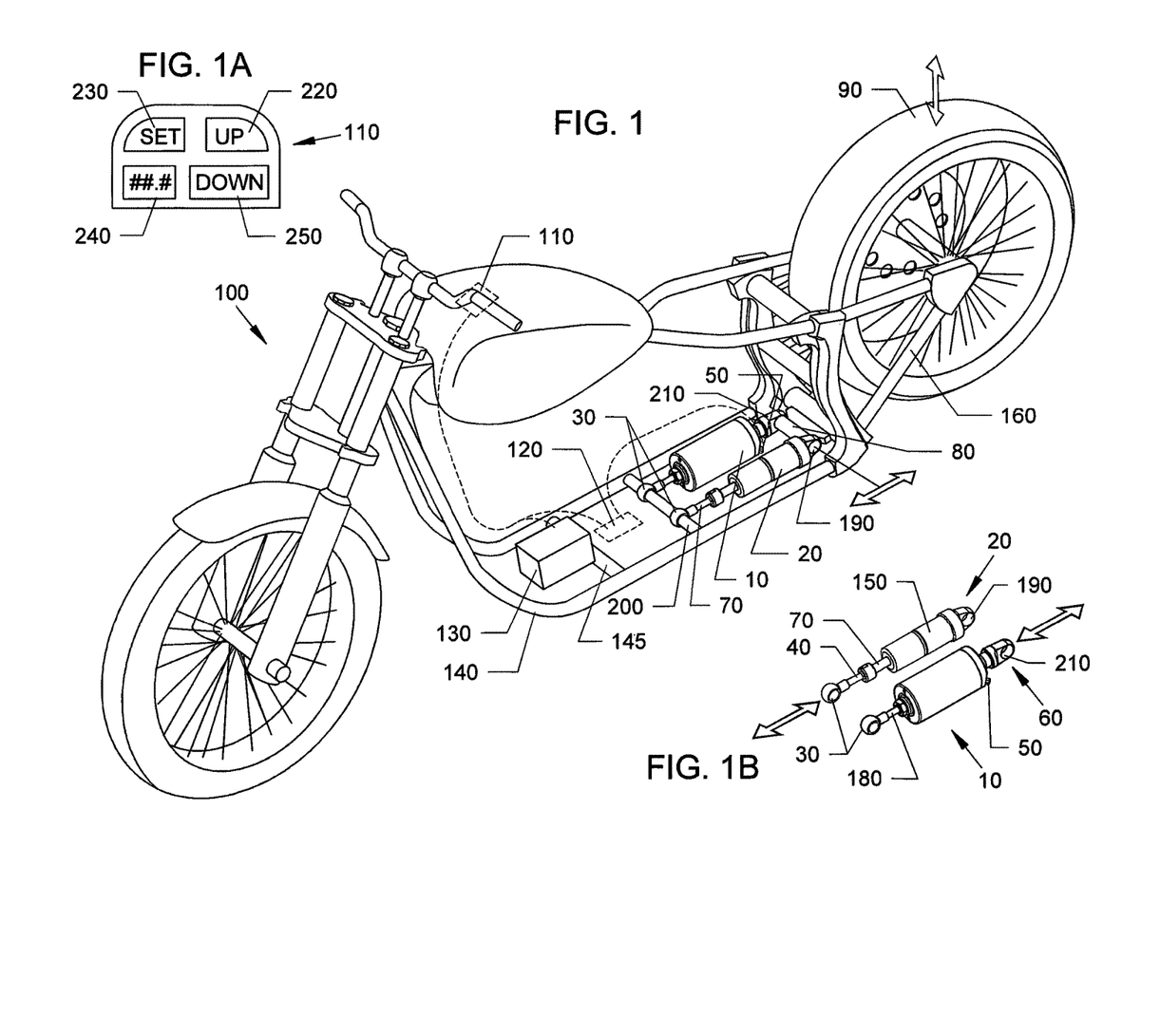
FIG. 1 is a perspective view of motorcycle frame with and air spring suspension device and decoupled damper mounted thereon.
FIG. 1A is an enlarged view of a handlebar control panel shown in FIG. 1.
FIG. 1B is a perspective view of the air shock assembly and damping assembly separate from the motorcycle frame.

FIG. 1 is a perspective view of motorcycle frame 100 with and air spring suspension device (air shock assembly) 10 and decoupled damper assembly 20 both mounted to the motorcycle frame 100. FIG. 1A is an enlarged view of a handlebar control panel 110 shown in FIG. 1. FIG. 1B is a perspective view of the air shock assembly 10 and damping assembly 20 separate from the motorcycle frame 100.

Figure 2:
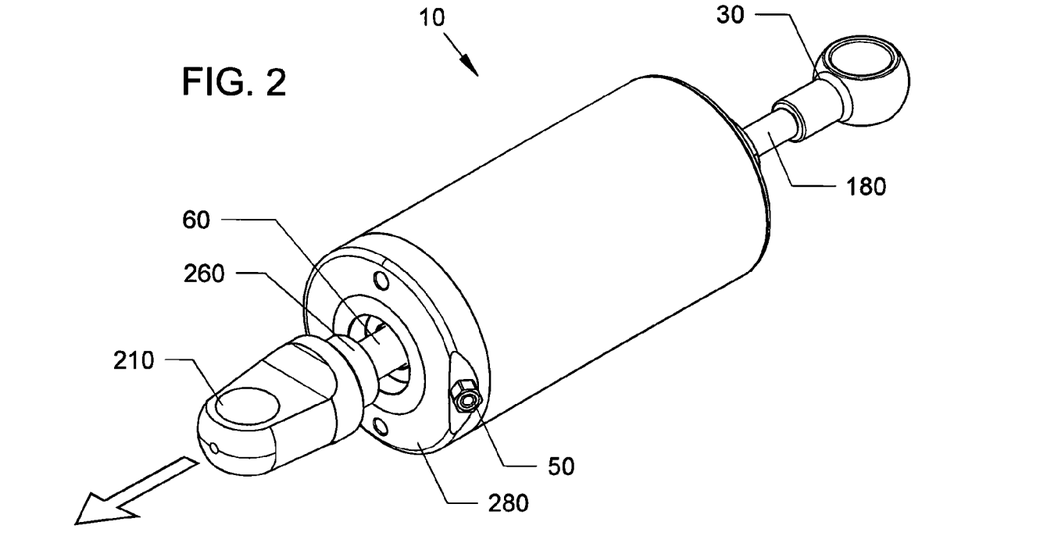
FIG. 2 is a perspective enlarged view of the novel shock assembly shown in FIG. 1 with the reciprocating shaft extended.

FIG. 2 is a perspective enlarged view of the novel air shock assembly 10 shown in FIG. 1 with the reciprocating shaft (rod) 60 extended.

Figure 3:
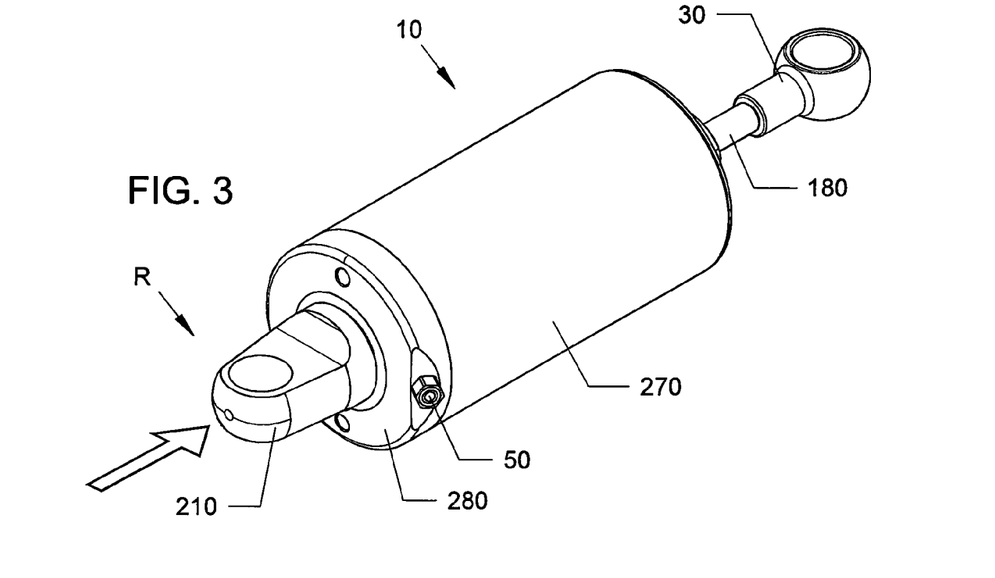
FIG. 3 is a perspective view of the shock assembly of FIG. 2 with the shaft retracted.

FIG. 3 is a perspective view of the air shock assembly 10 of FIG. 2 with the shaft (rod) 60 retracted (R).

Figures 4, 5:
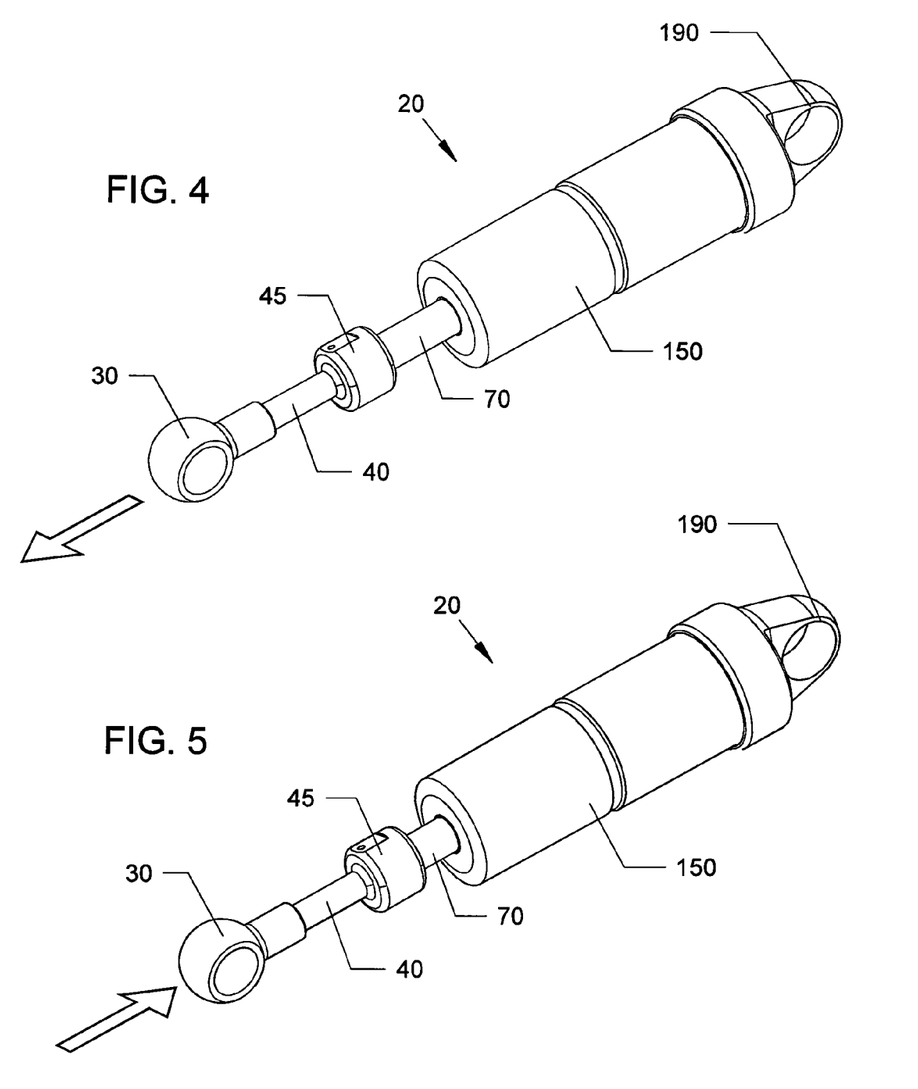
FIG. 4 is an enlarged perspective view of the damper assembly shown in FIG. 1 with the shaft extended.
FIG. 5 is a perspective view of the damper assembly of FIG. 4 with the shaft retracted.

FIG. 4 is an enlarged perspective view of the damper assembly 20 shown in FIG. 1 with the shaft (rod) 70 extended. FIG. 5 is a perspective view of the damper assembly 20 of FIG. 4 with the shaft 70 retracted.

Figure 6:
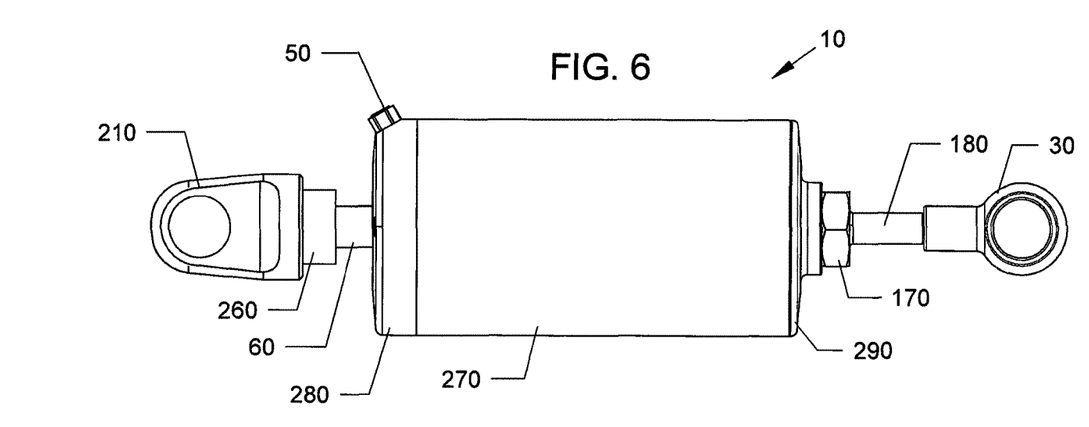
FIG. 6 is a top view of the shock assembly of FIG. 2 with shaft extended.
Figure 7:
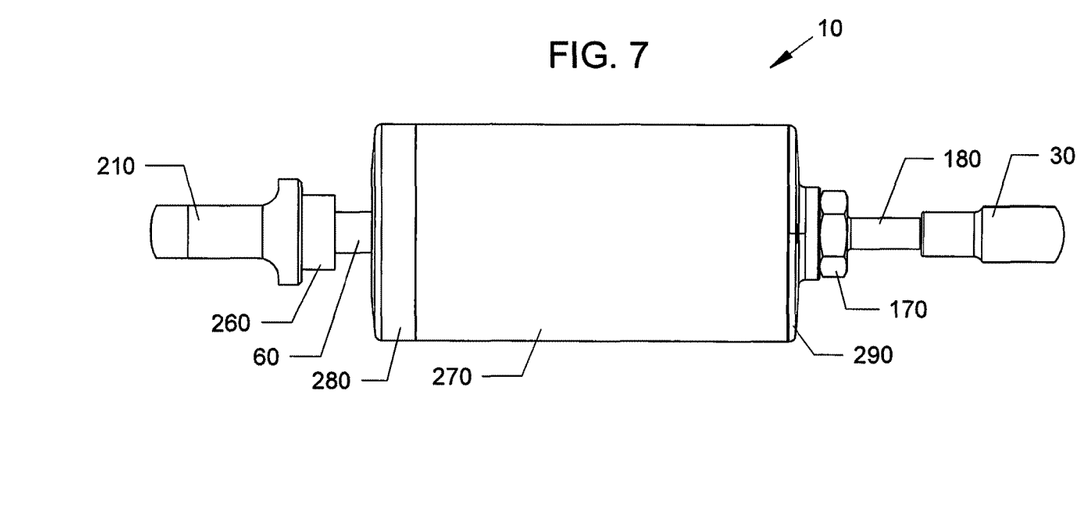
FIG. 7 is a front view of the shock assembly of FIG. 6.
Figure 8:
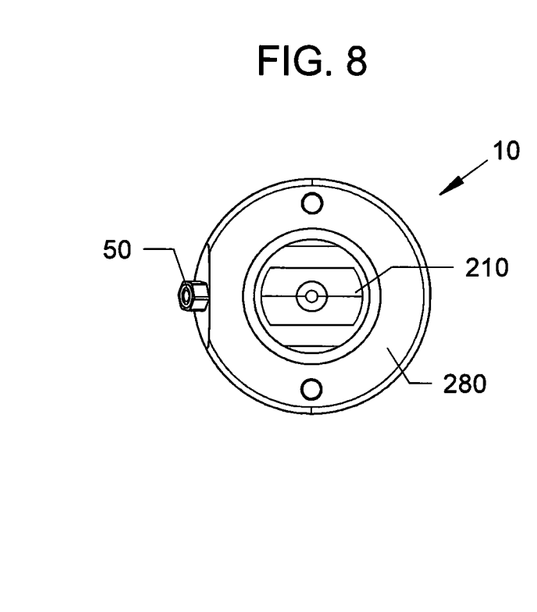
FIG. 8 is a left end view of the shock assembly of FIG. 6.
Figure 9:
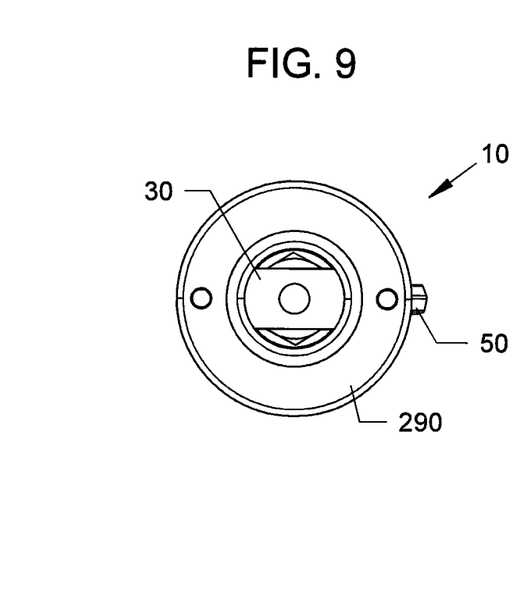
FIG. 9 is a right end view of the shock assembly of FIG. 6.

FIG. 6 is a top view of the air shock assembly 20 of FIG. 2 with shaft (rod) 60 extended. FIG. 7 is a front view of the shock assembly 10 of FIG. 6. FIG. 8 is a left end view of the shock assembly 10 of FIG. 6. FIG. 9 is a right end view of the shock assembly 10 of FIG. 6.

Figure 10A:
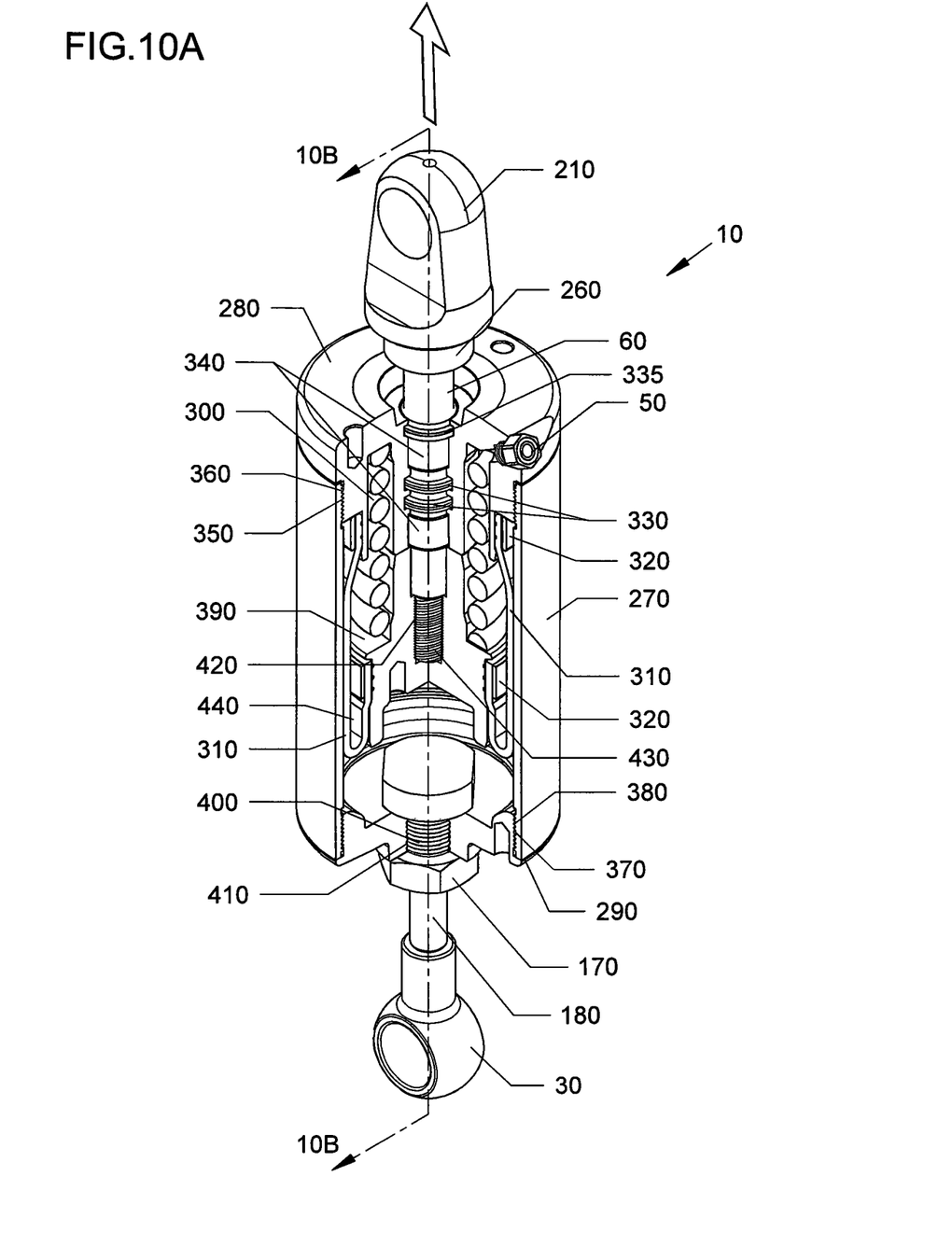
FIG. 10A is a cross sectional perspective view of the shock assembly of FIG. 2 with the shaft extended.
Figure 10B:
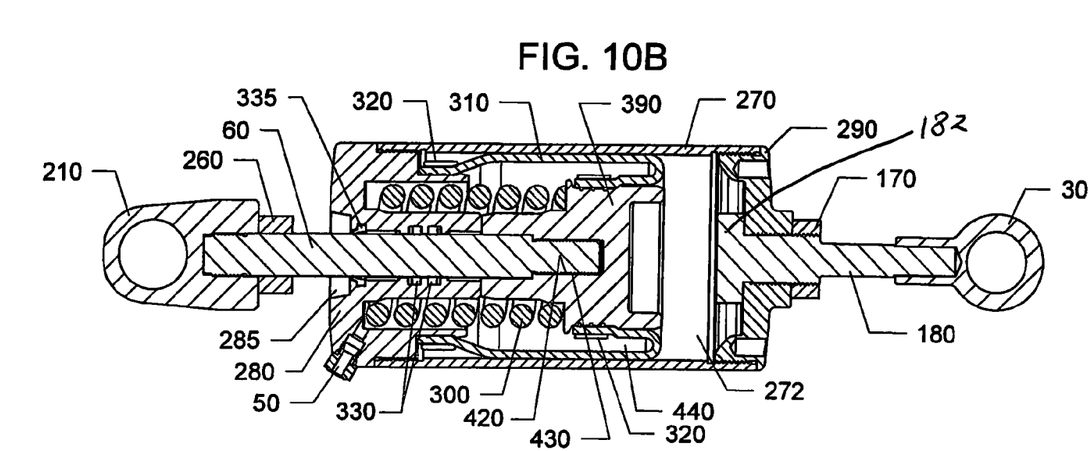
FIG. 10B is a cross-sectional planar view of the shock assembly with shaft extended of FIG. 10A along arrows 10B.

FIG. 10A is a cross sectional perspective view of the shock assembly 10 of FIG. 2 with the shaft (rod) 60 extended. FIG. 10B is a cross-sectional planar view of the shock assembly 10 with shaft (rod) 60 extended of FIG. 10A.

Figure 11A:
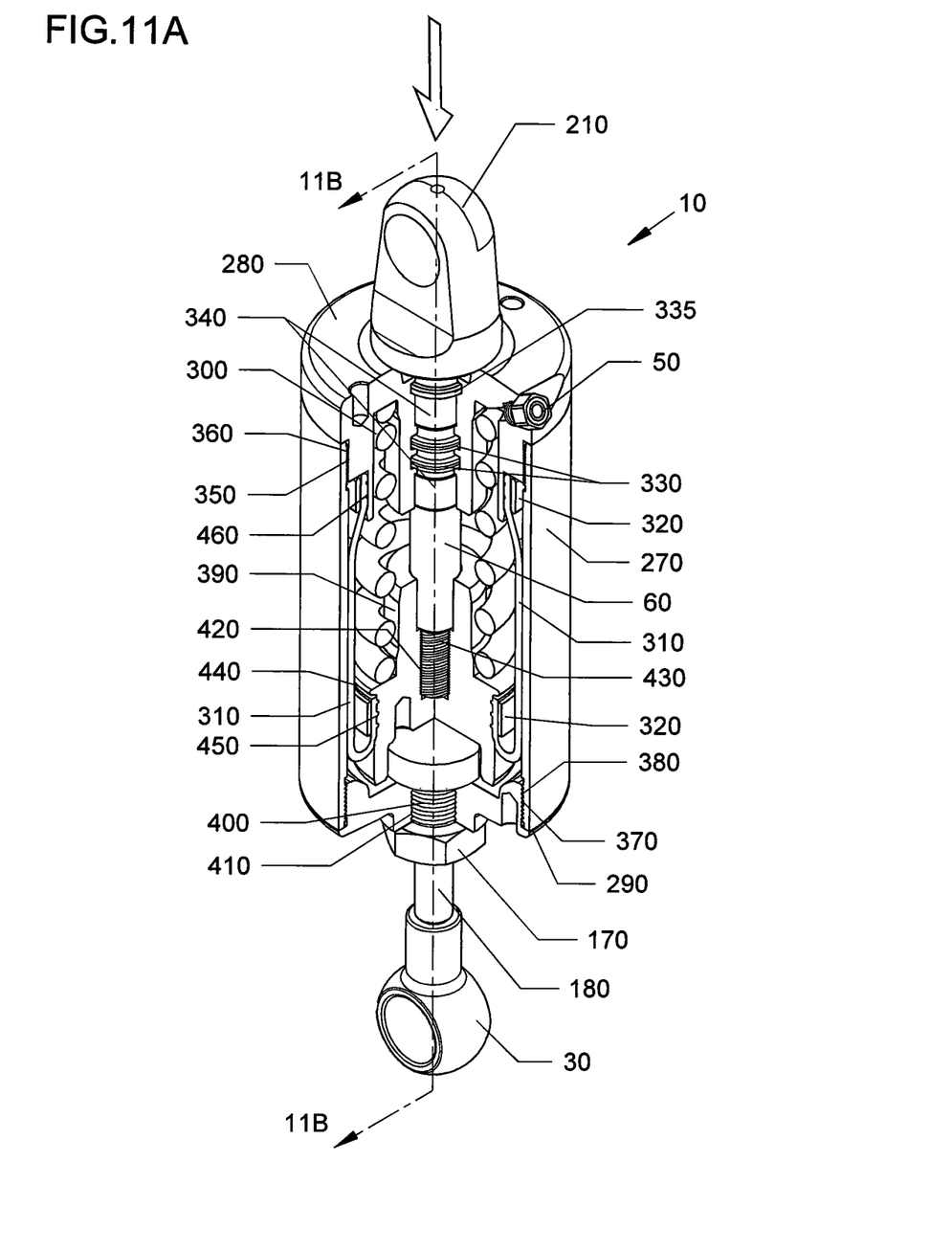
FIG. 11A is a cross-sectional perspective view of the shock assembly of FIG. 10A with the shaft retracted along arrows 11B.
Figure 11B:
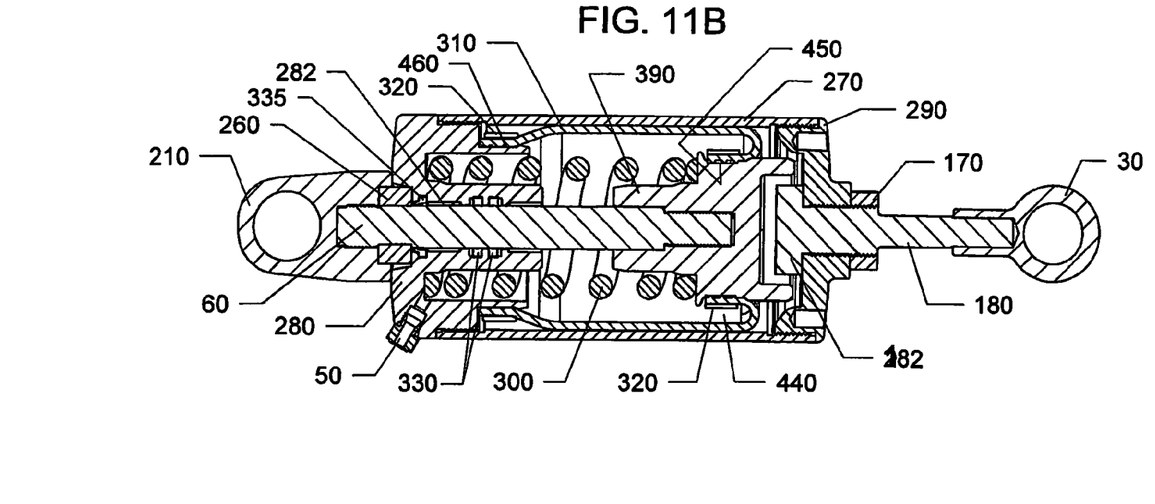
FIG. 11B is a cross-sectional planar view of the shock assembly with shaft retracted of FIG. 11A.

FIG. 11A is a cross-sectional perspective view of the shock assembly 10 of FIG. 10A with the shaft (rod) 60 retracted. FIG. 11B is a cross-sectional planar view of the shock assembly 10 with shaft (rod) 60 retracted of FIG. 11A.

Figure 12:
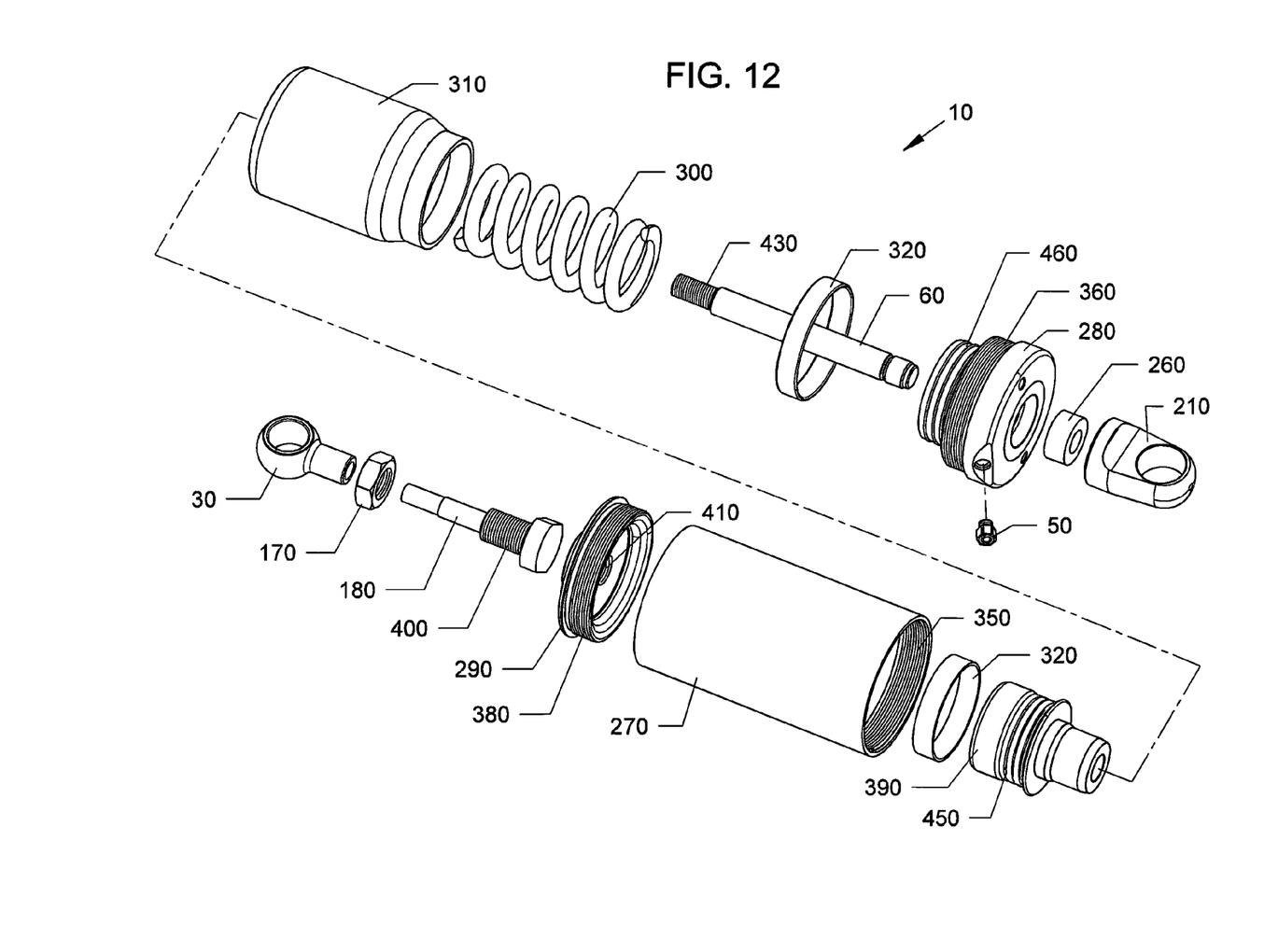
FIG. 12 is an exploded perspective view of the shock assembly of FIG. 2, with seals removed.

FIG. 12 is an exploded perspective view of the shock assembly 10 of FIG. 2, with seals 330, 335 (shown in FIGS. 10A-11BO removed.

Referring to FIGS. 1B, 2-3, and 6-12, the air shock assembly 10 can include a cylindrical air bag can 270 with a top end 280 threadably 350/360 attached thereto. A ring attachment 210 can be threadably secured to an outer end of a reciprocating rod 60, with a rubber shock absorbing ring 260 on the reciprocating rod 60 for fitting into the outer end conical shaped opening 285 in the top 280 of the air bag can 270. Shaft seal(s) 330 and a wiper seal 335 and shaft bushings 340 can allow for rod 60 to sealingly slide within inner chamber 282. Inner end of rod 60 can be fixably and threadably attached 420/430 to piston 390

Cylindrical air bag can 270 can have a bottom end 290 threadably attached 370/380 thereon. A fixed rod 180 can have an inner end fixably and threadably attached 400/410 into a mid-portion of the bottom end 290 by a stopper portion 182 extending into an air space 272 inside of the bottom end of the cylindrical can 270, with a rod nut 170 locking the inner end of the rod 180 in place. The outer end of the rod 180 can be fixed to a ring attachment 30. A bottom end of an airbag 310 can be secured to a piston 390 by a crimp ring 320 about a groove pattern 450 about piston 390, with the top end of the airbag 310 can be secured to a groove pattern 460 on the top end 280 of the air shock assembly by a another crimp ring 320. A coil spring 300 can be compressed inside the can 270 between top end 280 and piston 390.

A compressed air inlet 50 has an airline attached to an air compressor 120 (shown in FIG. 1), which allows air to be injected into the air bag can 270 into the interior airbag chamber 440 of the air bag 310.

Referring to FIGS. 1B, 4-5, damper assembly 20 can include a mono-tube damper assembly 150 with reciprocating rod 70, that can function as a hydraulic shock absorber, such as, but not limited to the hydraulic shock absorber shown and described in U.S. Pat. No. 2,856,035 to Rohacs, which is incorporated by reference. A damper post 40 can have an inner end threadably attached to the outer end of shaft (rod) 70 by a stopper 45, which can limit the retraction of rod (shaft) 70 into damper assembly 150. The outer end of damper post 40 can be fixably and threadably attached to ring attachment 30. The opposite end of damper assembly 150 can have a fixed ring attachment 190.

Referring to FIGS. 1, 1A, 1B, 2-12, ring attachment ends 30 of air shock assembly 10 and damper assembly 20 can be attached to a hard mounting point 200 on a lower section of the motorcycle frame 140.

Fixed ring attachment 190 on damper assembly 20 and ring attachment 210 on air shock assembly 10 can be attached to shaft 80 which is part of the rear suspension assembly on the back of motorcycle frame 140. The shock/damper shaft 80 reciprocates toward the front and back of the bike 100 when the rear wheel 90 (which is attached to frame 140 by rear wheel mount frame 160) encounters a bump in the road. The rear wheel 90 can reciprocate up and down then the wheel 90 encounters bumps in the road. The rear suspension translates this motion into the forward and rearward reciprocation of the shock/damper attachment shaft 80.

The air compressor 120 can be powered by a battery 130 that can both be attached to frame 140 by frame member 145.

Referring to FIGS. 1, 1A, 1B, a handlebar mounted control panel 110 can be connected to the battery power supply 130 located on the bike 100 which operates an air compressor 120 which supplies compressed air through air inlet port 50 previously described on the air shock assembly 10. On the panel 110, switches 220, 250 can be push button switches which either add compressed air to the air shock assembly 10 by depressing button 220, or remove air from the air shock assembly 10 by pressing on button 250. The depressible buttons 2250, 250 allow for instant inflation and deflation of the airbag (air bladder) 310 (shown in FIGS. 10A, 10B, 11A, 11B) within the air shock assembly 10, and allow the driver to achieve desired operating conditions of the air shock assembly 10 in minutes.

The air shock assembly 10 can operate similar to the combined air suspension device 1, shown and described in U.S. Pat. No. 8,113,322 to Arnott, which is incorporated by reference in its' entirety.

Here, an operating gauge 240 can show in real-time the amount of compressed air in air shock assembly 10, which can run from approximately 0 PSI (pounds per square inch) for minimum pressure level to as much as approximately 250 PSI for maximum pressure loads. A set button 230 can be preset to different pressure levels so that the operator can immediately depress to various pre-programmed pressure states for settings such as but not limited to states that are smooth and comfortable, firm and rigid, or somewhere in the middle. The rider can further make adjustments to the air suspension devices 1 based on their height, weight, and any other customized conditions as desired.

Adding Compressed Air (Inflating Airbag (Bladder))

Referring to FIGS. 1, 1A, 1B, 10A, 10B, 11A, 11B, as compressed air is pumped into compressed air inlet 50, airbag 310 expands downward (inflates) within can 170 as shown in FIGS. 7 and 11, while allowing spring 300 to naturally expand to a normal coil expanded state. While in a compressed air state with the airbag (bladder) inflated, the more air added, the firmer the ride is for the rider on the motorcycle.

In addition, as the piston members 60 retract into the airbag can 270, the air suspension device effectively pulls front frame and rear frame portions of the motorcycle together to raise the height of the motorcycle which is explained and shown in relation to FIGS. 15A-15B of U.S. Pat. No. 8,113,322 to Arnott, which is incorporated by reference.

Removing Compressed Air (Deflating Airbag (Bladder))

Referring to FIGS. 1, 1A, 1B, 10A, 10B, 11A, 11B, as compressed air is released outward from air inlet 50, airbag 320 retracts (deflates) within airbag can 270, while contracting spring 300 to a contracted state. While in an uncompressed air state with the airbag (bladder) deflated, the more air removed, the smoother the ride is for the rider on the motorcycle. As shown in FIGS. 10A, 10B, the air gap 272 allows for a greater amount of shock cushion effect which results in a smoother ride.

In addition, as the piston member 60 extends from the air shock assembly 10, the air suspension assembly 10 effectively pushes the front frame and rear frame portions of the motorcycle apart from one another so that the height of the motorcycle becomes lower which is explained and shown in relation to FIGS. 15A-15B of U.S. Pat. No. 8,113,322 to Arnott, which is incorporated by reference.

While the figures show the novel combination of air shock assembly 10 and damper assembly 20 mounted in one arrangement, the air shock assembly 10 and damper assembly 20 can be oppositely mounted to the motorcycle.

While the preferred embodiment describes the invention as being attached to two wheeled vehicles, such as motorcycles, the invention can be applied to and used with other vehicles.

Although the invention describes use of the air suspension system with air, the invention can be used with other fluids, such as but not limited to other types of gases, liquids, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A suspension system with an air spring and separate decoupled damper, for two wheeled vehicles, comprising:
   a two wheeled motorized vehicle having a front wheel and a rear wheel;
   a frame for the vehicle having a front frame portion attached to the front wheel, and a rear frame portion attached to the rear wheel;
   an air shock having a housing with first end and a opposite facing second end attached to the front and rear frame portions of the vehicle, with one of the first end and the second end being extendable and retractable from the air shock housing, the air shock includes a shock absorber having a slidable piston having an exterior end outside of the housing and an opposite facing inner end being inside of the housing, the slidable piston having an extended position and retracted position, an internal spring having an extended position and a retracted position, and an internal inflatable bladder having an inflated position and a deflated position, wherein inflating the bladder to the inflated position causes the spring to move from the retracted position to the extended position and the piston of the shock absorber to move to the retracted position causing the exterior end of the piston to be retracted toward the first end of the housing with the inner end of the piston moving toward the second end of the housing, and wherein deflating the bladder to the deflated position causes the spring to contract to the retracted position and the exterior end of the piston on the shock absorber to become extended away from the first end of the housing with the second end of the piston being completely separated and spaced apart from the second end of the housing; and
   an hydraulic damper positioned side by side with the air shock, the hydraulic damper assembly having a housing with first end and a opposite facing second end attached to the front and rear frame portions of the vehicle, with one of the first end and the second end being extendable and retractable from the air shock housing, wherein the damper housing is completely decoupled and separate from the air shock housing.

2. The suspension system of claim 1, further comprising:
   a control for adjusting compressed fluid levels between a source of compressed fluid and the air shock housing, wherein increasing and inflating compressed fluid levels inside the air shock housing causes one of the first end and the second end to retract into the air shock housing so that the air shock pulls the front wheel toward the rear wheel and raises the vehicle over a ground surface, and deflating and uncompressing fluid levels inside of the air shock housing allows for the front wheel and the rear wheel to pull apart from one another lowering the vehicle over the ground surface.

3. The suspension system of claim 1, wherein the two wheeled motorized vehicle is a motorcycle.

4. The suspension system of claim 2, wherein the fluid is a gas.

5. The suspension system of claim 2, wherein the fluid is air.

6. A method of providing a suspension system for two wheeled with vehicles with damper decoupled from an air shock, comprising the steps of:
   providing a two wheeled vehicle having a front wheel and a rear wheel;
   providing a frame for the vehicle having a front frame portion attached to the front wheel, and a rear frame portion attached to the rear wheel;
   providing an air shock in a housing having one end extendable and retractable from the air shock housing;
   providing a separate hydraulic damper in a housing, with one end extendable and retractable from the hydraulic damper housing;

mounting the air shock housing and the separate hydraulic damper housing side by side with each other to the front and rear frame portions of the vehicle, providing air shock and damping to the vehicle with the damper housing decoupled from the air shock housing;

providing a shock absorber having a slidable piston with an exterior end outside of the housing and an opposite facing inner end being inside of the housing, the slidable piston having an extended position and retracted position, providing an internal spring having an extended position and a retracted position;

providing an internal inflatable bladder having an inflated position and a deflated position;

inflating the bladder to the inflated position causes the spring to move from the retracted position to the extended position and the piston of the shock absorber to move to the retracted position causing the exterior end of the piston to be retracted toward the first end of the housing with the inner end of the piston moving toward the second end of the housing; and deflating the bladder to the deflated position causes the spring to contract to the retracted position and the exterior end of the piston on the shock absorber to become extended away from the first end of the housing with the second end of the piston being completely separated and spaced apart from the second end of the housing.

7. The method of claim 6, further comprising the step of: adjusting compressed fluid levels in the air shock housing.

8. The method of claim 7, further comprising the steps of: increasing and inflating compressed fluid levels inside the air shock housing so that that the front wheel is pulled toward the rear wheel and raises the vehicle over a ground surface; and deflating and uncompressing fluid levels in the air shock housing for the front wheel and the rear wheel to pull apart from one another lowering the vehicle over the ground surface.

9. The method of claim 6, further comprising the step of: inflating a bladder inside of the air shock housing to raise the two wheeled vehicle over the ground surface.

10. The method of claim 6, further comprising the step of: deflating a bladder inside of the air shock housing to lower the two wheeled vehicle to the ground surface.

11. The method of claim 8, wherein inflating and the increasing of compressed fluid levels inside the air shock housing includes the step of:
providing a firmer ride to a rider on the two wheeled vehicle.

12. The method of claim 8, wherein deflating and the decreasing of compressed fluid levels inside the air shock housing includes the step of:
providing a smoother ride to a rider on the two wheeled vehicle.

13. The method of claim 6, wherein the two wheeled motorized vehicle is a motorcycle.

14. The method of claim 6, wherein the fluid is a gas.

15. The method of claim 6, wherein the fluid is air.

\* \* \* \* \*